(No Model.)
H. WITHEY.
DEVICE FOR APPLYING STAY WIRES TO WIRE FENCES.
No. 601,864.  Patented Apr. 5, 1898.
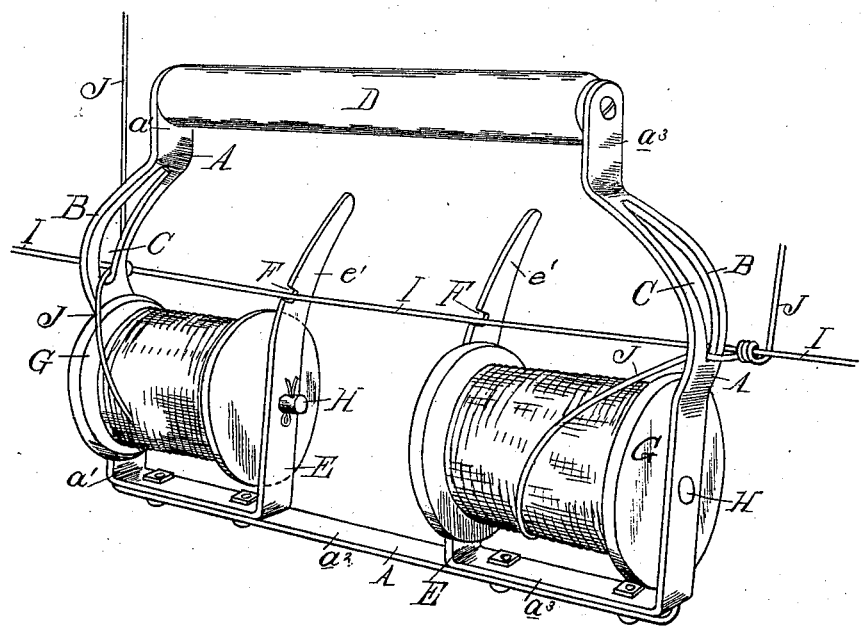
Witnesses:
Otto H. Bartlett
M. B. O. Dogherty
Inventor:
Henry Withey,
By Thos. S. Sprague & Son,
Attorneys.

United States Patent Office.

HENRY WITHEY, OF HASTINGS, MICHIGAN.

DEVICE FOR APPLYING STAY-WIRES TO WIRE FENCES.

SPECIFICATION forming part of Letters Patent No. 601,864, dated April 5, 1898.

Application filed August 16, 1897. Serial No. 648,412. (No model.) Patented in Canada August 4, 1896, No. 53,102.

*To all whom it may concern:*

Be it known that I, HENRY WITHEY, a citizen of the United States, residing at Hastings, in the county of Barry, Michigan, have invented certain new and useful Improvements in Devices for Applying Stay-Wires to Wire Fences, (for which I have obtained a patent in Canada, No. 53,102, dated August 4, 1896,) of which the following is a specification, reference being had therein to the accompanying drawing.

This invention relates to that class of devices for manufacturing wire fences in which a series of horizontal line-wires are first placed in position on the fence and then secured together by vertical stay-wires; and the object of the invention is to provide a device for the purpose of applying the stay-wires in a simple and expeditious manner; and to this end my invention provides for a hand-tool by means of which two stays may be applied to the line-wires at one operation, and which tool is so constructed that it coils the stay-wires tightly around the line-wire, while at the same time it is firmly guided by the line-wire and lessens the work of the operator so considerably that he can accomplish more work than with devices in present use, all as more fully hereinafter described, and shown in the accompanying drawing, in which my device is shown in perspective view.

A designates a frame, which may be formed of any suitable size or shape and of any suitable material; but it is preferably formed of metal in the shape shown and in three sections $a'$ $a^2$ $a^3$.

The sections $a'$ and $a^3$ are each formed with the swell or projecting portion B, and in each of the latter a slot or opening C is formed, the purpose of both of which will be hereinafter set forth.

E E designate standards, one of which is secured to or formed integral with each of the sections $a'$ and $a^3$. The upper ends $e'$ of each of these standards E are beveled and inclined outward and provided with a notch or recess F, as shown.

D designates a handle with which the frame A is provided.

G G designate spools or reels, and H a spindle with which each of the spools G is provided, and these spindles H H are supported by and revolve perfectly free in bearings in the sections $a'$ and $a^3$.

I designates one of a series of longitudinal wires which are drawn taut and secured at their ends to fence-posts or other objects, and J J designate stay-wires which are first wound on the spools G G.

The operation is as follows: The weaving device is grasped by the handle D and adjusted so that the wire I will rest against the beveled ends $e'$ of the standards E E. When adjusted as described, on moving the handle D from the wire I the latter will be conducted and guided by the beveled ends $e'$ until it engages with the notches F F, and said wire I will be held or locked in said notches F F from accidental displacement by being interposed between the standards E E and the outer end portions of the sections $a'$ and $a^3$, as shown. When adjusted as described, the wire I forms a bearing for the machine to turn on. When in this position, by extending the wires J through the openings C and holding them in contact with the wire I and rotating the machine around said wire I the wires J will uncoil from the spool G and be coiled, twisted, or otherwise passed around and tightly bound on the wire I to firmly secure these wires together where they intersect or cross each other. When the wires J are firmly secured to one of the series of wires I, the machine may be disengaged from said wire I by grasping the latter by the hand and springing it out of the notches F, after which the machine may be adjusted to another wire I of the series to be engaged therewith and operated as before described to firmly secure the wires J J to another wire I, and by forming the slots C in the outer ends of the sections $a'$ and $a^3$ and projecting the wires J through them to engage with the wire I permits the wires J J to extend without folding or bending and perfectly taut from one wire I to another; and by forming the swell or projection B on the outer end portions of the sections $a'$ and $a^3$, as shown, the spaces between the cross-wires J J are regulated thereby to be an even distance apart or to extend uniformly across the series of wires I. These projections B B also permit the body of the machine to pass freely between the cross-wires J J when rotating it to coil or twist the wires J around said wires I.

By forming the frame in three sections $a'$, $a^2$, and $a^3$ the handle D and section $a^2$ may be removed and another arm D and section $a^2$ of any length desired may be used in their place, according to the distance required between the cross-wires J J. This machine may therefore be adapted to give any distance required between the cross-wires J.

It will be seen that my device requires a minimum of effort and attention on the part of the operator to engage and disengage it from the line-wires, while at the same time when engaged it cannot accidentally become disengaged, as the line-wire will perfectly guide the tool without the aid of the operator. Further, the force in turning is applied equally on both sides of the hand and the turning therefore will not tire the hand of the operator, and the opportunity of using the lower bar $a^2$ for an additional handhold gives him temporary relief when one hand becomes tired.

It will also be seen that on account of the two spools being close to the openings C C the stay-wires in passing through these openings are bent at an angle sufficient to provide a uniform tension to coil the stay-wire tightly around the line-wire without the necessity of providing tension devices on the spools, which, as well known, would provide a constantly-increasing tension as the wire on the spool becomes exhausted, and for this and other reasons a large amount of stay-wire can be carried on the spools. The spools may be constructed in any desired manner.

I also do not limit myself to the details of construction of the other parts, as they may be variously modified without changing the spirit of my invention, so, if desired, the frame may be constructed all in one piece or the different parts may be provided with other known means for adjusting it to weave the stays closer together or farther apart. It is also within the spirit of my invention to adapt the construction for the weaving of one stay-wire only.

What I claim as my invention is—

1. A frame A, formed with a swell or projection B and with an opening C, and a handle D, in combination with the spool G, and means for supporting the latter, and standards E, E, formed with the beveled or inclined ends $e'$ and with a notch or recess F, substantially as and for the purpose set forth.

2. A frame A, formed in three sections $a'$, $a^2$, and $a^3$, and the sections $a'$ and $a^3$ each formed with the swell or projection B and with an opening C, and a handle D, in combination with the spools G G, and means for supporting the latter, and the standards E E, formed with the beveled or inclined end $e'$ and with a notch or recess F, substantially as and for the purpose set forth.

3. In a tool for weaving stay-wires, the combination of an inclosing frame comprising two outwardly-curving side bars formed with openings, a handle-bar between the side bars at one end, and an end bar connecting the opposite ends, curved standards mounted upon said end bar and provided with notches for the line-wires, and wire-carrying spools mounted between the side bars and the adjacent standards.

In testimony whereof I affix my signature in presence of two witnesses.

HENRY WITHEY.

Witnesses:
H. L. NEWTON,
THOMAS SULLIVAN.